(12) United States Patent
Carpenter et al.

(10) Patent No.: US 6,568,639 B2
(45) Date of Patent: May 27, 2003

(54) AUTONOMOUS ORBIT TRANSFER VEHICLE

(75) Inventors: Jon J. Carpenter, Redondo Beach, CA (US); Jeffrey J. Cronick, Huntington Beach, CA (US); Jennifer L. Green, Safety Harbor, FL (US); Brian R. Lindley, Corona del Mar, CA (US); James K. Wechsler, Irvine, CA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 09/945,090

(22) Filed: Aug. 31, 2001

(65) Prior Publication Data

US 2003/0042369 A1 Mar. 6, 2003

(51) Int. Cl.[7] .............................. B64G 1/10; B64G 1/24
(52) U.S. Cl. ....................................................... 244/172
(58) Field of Search .......................... 244/158 R, 172, 244/173

(56) References Cited

U.S. PATENT DOCUMENTS

| | | |
|---|---|---|
| 2,941,764 A | 6/1960 | Lee, Jr. et al. |
| 3,421,714 A | 1/1969 | Koerner |
| 3,700,193 A | 10/1972 | Bradley |
| 3,702,688 A | 11/1972 | Faget |
| 3,753,536 A | 8/1973 | White |
| 3,891,160 A | 6/1975 | Minovitch |
| 3,929,306 A | 12/1975 | Faget et al. |
| 3,955,784 A | 5/1976 | Salkeld |
| 4,079,904 A | 3/1978 | Groskopfs et al. |
| 4,082,240 A | 4/1978 | Heathman et al. |
| 4,265,416 A | 5/1981 | Jackson et al. |
| 4,451,017 A | 5/1984 | Marshall |
| 4,471,926 A | 9/1984 | Steel, III |
| 4,580,746 A | 4/1986 | Peck ........................... 244/140 |
| D291,555 S | 8/1987 | Rosenthal ................... D12/334 |
| 4,723,736 A | 2/1988 | Rider |
| 4,802,639 A | 2/1989 | Hardy et al. .................... 244/2 |
| 4,834,324 A | 5/1989 | Criswell ...................... 244/160 |
| 4,884,770 A | 12/1989 | Martin |
| 5,031,857 A | 7/1991 | MacConochie et al. |
| 5,090,642 A | 2/1992 | Salkeld ................... 244/158 R |
| 5,141,181 A | 8/1992 | Leonard ...................... 244/172 |
| 5,143,327 A | 9/1992 | Martin |
| 5,186,419 A | 2/1993 | Scott |
| 5,203,844 A | 4/1993 | Leonard ................. 244/158 R |

(List continued on next page.)

OTHER PUBLICATIONS

Charles J. Sosa et al., Design and Integration of a Cryogenic Propellant Crossfeed System for Parallel Burn Vehicles, © 1993 by the American Institute of Aeronautics and Astronautics, Inc., 12 pgs.

*Primary Examiner*—Robert P. Swiatek
(74) *Attorney, Agent, or Firm*—Harness, Dickey & Pierce, P.L.C.

(57) ABSTRACT

An orbit transfer vehicle for transporting cargo between a low Earth orbit and a higher Earth orbit having a body and an engine operably coupled to the body. A reaction control system is further provided and is operably coupled to the body. The reaction control system having a plurality of thrusters capable of maneuvering the orbit transfer vehicle. The orbit transfer vehicle further includes an energy absorbing panel operable to gather energy and an energy storage device operable to store the energy. Still further, a payload interface mechanism is provided having a payload container area and a payload retaining device. The payload retaining device is connectable to the cargo. Lastly, a controller for autonomously controlling the engine, the reaction control system, and the payload interface mechanism to control the orbit transfer vehicle so as to transport the cargo between a low Earth orbit to a higher Earth orbit.

11 Claims, 5 Drawing Sheets

U.S. PATENT DOCUMENTS

| | | | |
|---|---|---|---|
| 5,217,187 A | 6/1993 | Criswell | 244/158 R |
| 5,228,644 A * | 7/1993 | Garriott et al. | 244/158 R |
| 5,242,135 A | 9/1993 | Scott | |
| 5,295,642 A | 3/1994 | Palmer | |
| 5,322,248 A | 6/1994 | Ragab | |
| 5,456,424 A | 10/1995 | Palmer | 244/2 |
| 5,507,451 A | 4/1996 | Karnish | 244/2 |
| 5,626,310 A | 5/1997 | Kelly | |
| 5,740,985 A | 4/1998 | Scott et al. | 244/2 |
| 5,799,902 A | 9/1998 | Keith et al. | |
| 5,927,653 A | 7/1999 | Mueller et al. | |
| 6,017,000 A * | 1/2000 | Scott | 244/158 R |
| 6,056,237 A | 5/2000 | Woodland | |
| 6,113,032 A | 9/2000 | Cochran et al. | |
| 6,149,104 A * | 11/2000 | Soranno | 244/158 R |
| 6,158,693 A | 12/2000 | Mueller et al. | |
| 6,193,187 B1 | 2/2001 | Scott et al. | 244/2 |
| 6,286,787 B1 * | 9/2001 | Fleeter | 244/158 R |
| 6,382,563 B1 | 5/2002 | Chiu | 244/120 |
| 6,398,166 B1 | 6/2002 | Ballard et al. | 244/160 |

* cited by examiner

- Pressurized Utilization
  - ⇧ 88% of USOS hardware is considered recoverable
  - ⇧ 12% of Russian hardware is considered recoverable
- Unpressurized Utilization
  - ⇧ 82% of USOS hardware is considered recoverable
- Pressurized Logistics
  - ⇧ 97% of NASA and CSA hardware is considered recoverable
  - ⇧ 19% of NASDA hardware is considered recoverable
  - ⇧ 0% of ESA hardware is considered recoverable
  - ⇧ 0% of Russian hardware is considered recoverable
- Unpressurized Logistics
  - ⇧ 85% of NASA and CSA hardware is considered recoverable
  - ⇧ 41% of NASDA hardware is considered recoverable
  - ⇧ 0% of ESA hardware is considered recoverable
  - ⇧ TBD% of Russian hardware is considered recoverable

- Crew Supplies
  - ⇧ 21% of USOS frozen food is considered recoverable
  - ⇧ 26% of USOS ambient food is considered recoverable
  - ⇧ 60% of USOS crew clothes is considered recoverable
  - ⇧ 21% of SOS Crew (Miscellaneous) is considered recoverable
  - ⇧ 0% of Russian crew supplies are considered recoverable
- Crew Health Care System (CHeCS)
  - ⇧ 71% of USOS CHeCS supplies are considered recoverable
  - ⇧ 0% of Russian CHeCS supplies are considered recoverable
- Cargo Accommodations
  - ⇧ All USOS carriers and subcarriers are returned and re-flown

*Figure - 2*

AUTONOMOUS ORBIT TRANSFER VEHICLE

FIELD OF THE INVENTION

The present invention generally relates to space vehicles and, more particularly, relates to an orbit stage transfer vehicle capable of autonomously transporting cargo from a low Earth orbit to a high Earth orbit.

BACKGROUND OF THE INVENTION

As is well known, the International Space Station (ISS) is intended to be completed in 2005. After completion, it is anticipated that a human crew will remain on-board during its entire operational life. To facilitate such a long term presence in space, it will be periodically necessary to provide needed supplies and equipment to the ISS. For example, FIG. 1 illustrates the projected yearly supply requirements for the ISS through 2020. As can be clearly seen, there is a recurring need to simply and conveniently transport supplies to the ISS.

Furthermore, as seen in FIG. 2, there is an exorbitant amount of supplies that must be transported from the ISS to Earth. These supplies may be recycled, refurbished, or otherwise recovered through these return operations.

Currently, the United States Space Shuttle and the Russian Soyuz and Progress vehicles handle the resupply operations during the construction phase of the ISS. However, following completion of the ISS, the majority of the resupply operations will be carried out by the aging Space Shuttle until the retirement of the Space Shuttle program. At which time, alternative vehicles will be needed to carry out the resupply missions. Currently, there are efforts to develop a reusable launch vehicle. However, these reusable launch vehicles typically achieve a low Earth orbit, yet the ISS is currently in a high Earth orbit (approximately 248 nautical miles MSL).

Accordingly, there exists a need in the relevant art to provide a transfer vehicle capable of transporting cargo from a low Earth orbit to a high Earth orbit. Furthermore, there exists a need in the relevant art to provide a transfer vehicle capable of performing such transport of cargo autonomously. Still further, there exists a need in the relevant art to overcome the disadvantages of the prior art.

SUMMARY OF THE INVENTION

According to the principles of the present invention, an orbit transfer vehicle for transporting cargo between a low Earth orbit and a high Earth orbit having an advantageous construction is provided. The orbit transfer vehicle includes a body and an engine operably coupled to the body. A reaction control system is further provided and is operably coupled to the body. The reaction control system has a plurality of thrusters capable of maneuvering the orbit transfer vehicle. The orbit transfer vehicle further includes an energy absorbing panel operable to gather energy and an energy storage device operable to store the energy. Still further, a payload interface mechanism is provided having a payload container area and a payload retaining device. The payload retaining device is connectable to the cargo. Lastly, a controller for autonomously controlling the engine, the reaction control system, and the payload interface mechanism is provided to control the orbit transfer vehicle so as to transport the cargo between a low Earth orbit to a high Earth orbit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table illustrating the projected cargo return requirement of the ISS;

DETAILED DESCRIPTION OF THE PREFERRED EMBODIMENTS

Figure 1:
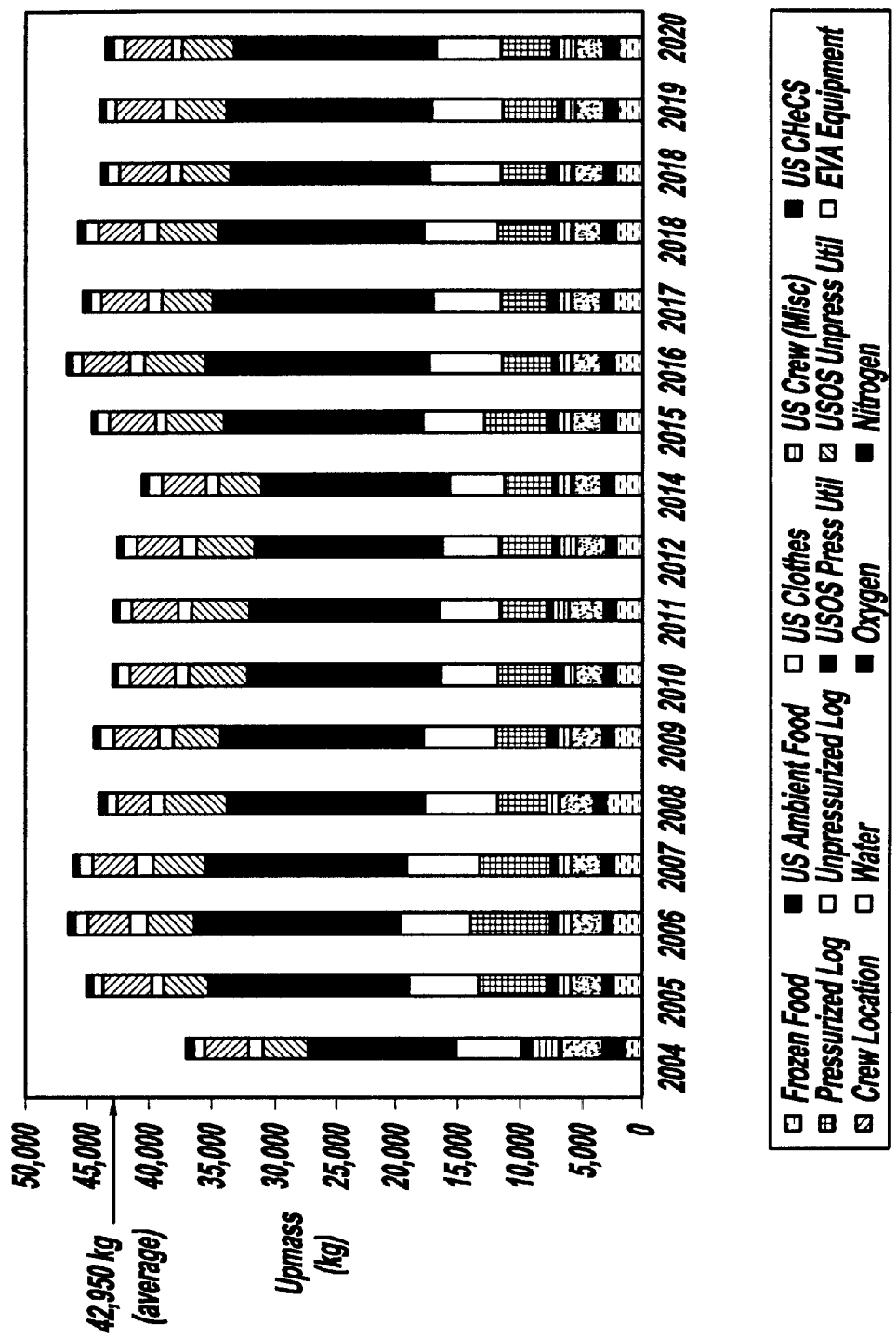
FIG. 1 is a bar graph illustrating the projected yearly supply requirements of the International Space Station (ISS)
Figure 3:
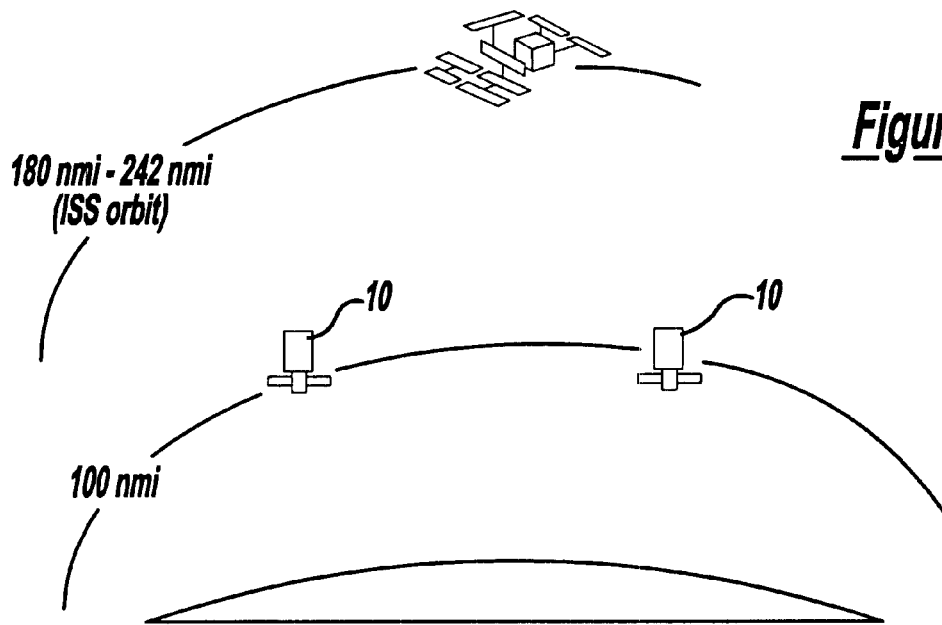
FIG. 3 is an environmental view illustrating the orbit transfer vehicle according to the principles of the present invention in a low Earth orbit.
Figure 4:
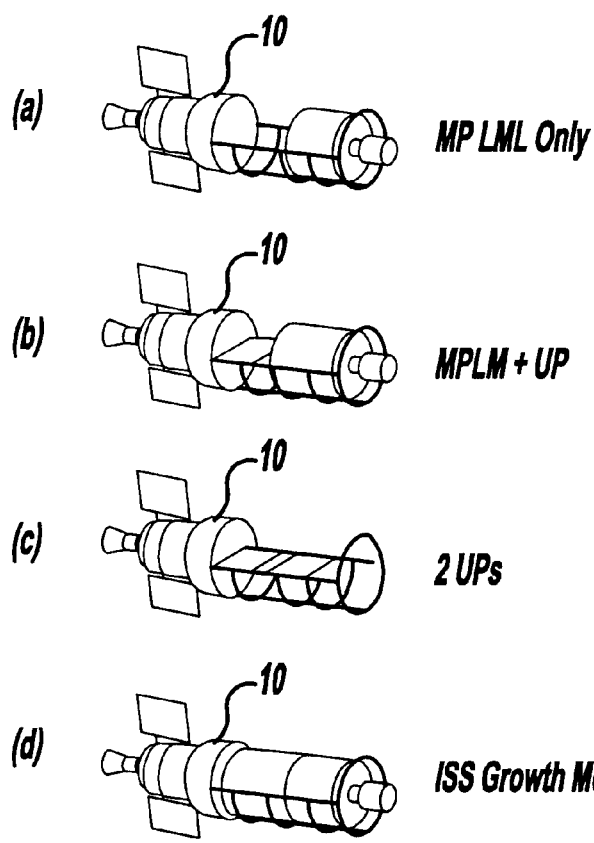
FIGS. 4(*a*)–(*d*) are perspective views illustrating the orbit transfer vehicle of the present invention having varying payloads disposed therein.
Figure 5:
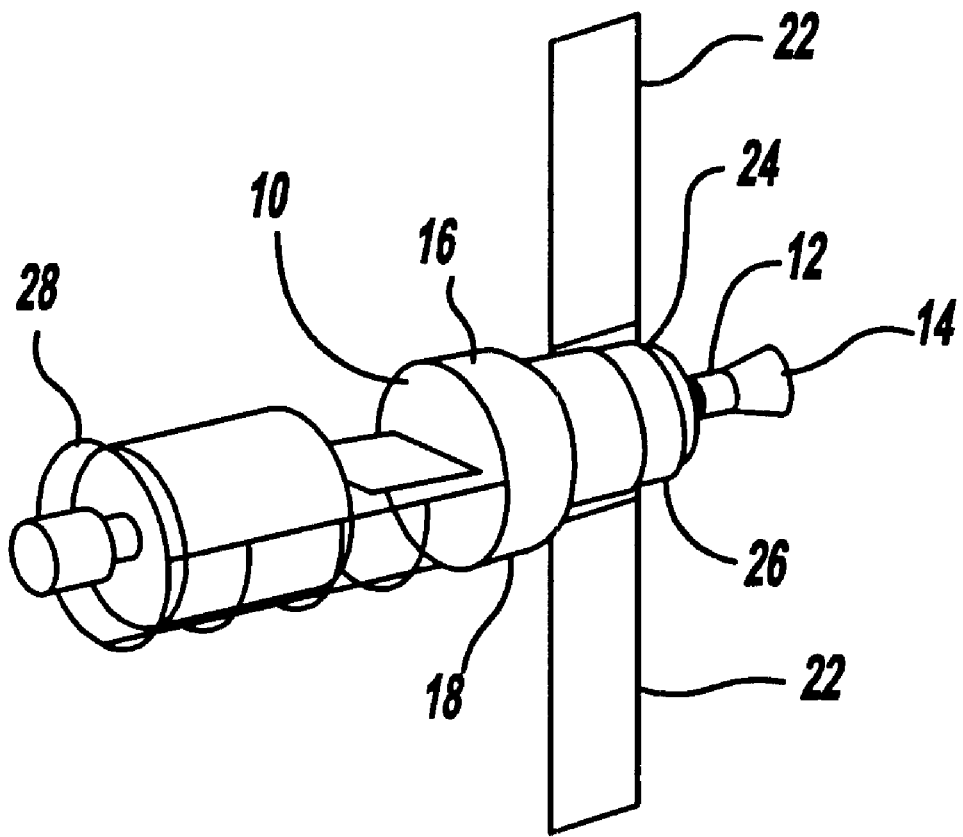
FIG. 5 is a perspective view illustrating the orbit transfer vehicle of the present invention having a pressurized container and an unpressurized pallet disposed therein.
Figure 6:
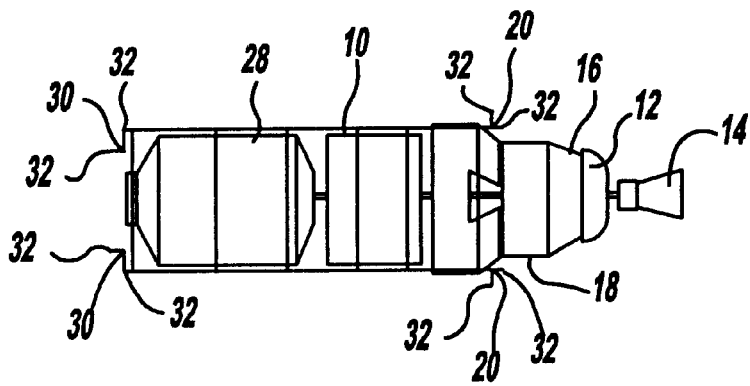
FIG. 6 is a plan view illustrating the orbit transfer vehicle of FIG. 5.
Figure 7:
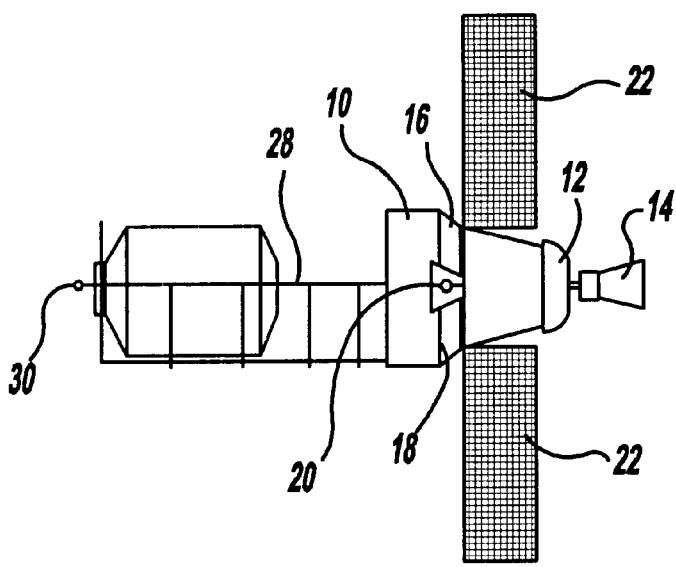
FIG. 7 is a side view illustrating the orbit transfer vehicle of FIG. 5.

The following description of the preferred embodiment is merely exemplary in nature and is in no way intended to limit the invention, its application, or uses.

Referring to the drawings, an autonomous orbit transfer vehicle, generally indicated at 10, is provided that is capable of transporting cargo from a low Earth orbit to a high Earth orbit, including the ISS orbit altitude of 248 nautical miles. Orbit transfer vehicle 10 is an orbital transfer stage that is developed for use with a separate launch vehicle, such as, but not limited to, a reusable launch vehicle. As will be explained below, orbit transfer vehicle 10 employs a propulsion and control module consisting of a rocket engine, propellant tanks, and control hardware and software allowing orbit transfer vehicle 10 to maneuver between orbital stages without the need of human control. Orbit transfer vehicle 10 further utilizes a payload interface that is compatible with the Space Transportation System (STS) of the Space Shuttle. Therefore, cargo that is or would have been transported by the Space Shuttle may be transported by orbit transfer vehicle 10 without the need for modification. Still further, orbit transfer vehicle 10 does not require a crew to transfer cargo to orbit transfer vehicle 10, thereby operating autonomously.

Orbit transfer vehicle 10 includes a propulsion and control module 12 for controlling the maneuvering of orbit transfer vehicle 10. Specifically, propulsion and control module 12 includes a maneuvering engine 14, a fuel tank 16, an oxidizer tank 18, an aft reaction control system 20, a pair of energy absorbing panels 22, an energy storage device 24, and a controller 26. Furthermore, orbit transfer vehicle 10 still further includes a payload interface 28. Payload interface 28 consists of a structural support that is conventional in coupling design as the payload interface of the Space Shuttle to facilitate simple and convenient coupling of cargo without the need for modification. Payload interface 28 further includes a forward reaction control system 30.

Maneuvering engine 14 is a conventional chemical bi-propellant based rocket engine, such as but not limited to liquid hydrogen fuel and liquid oxygen propellant. Maneuvering engine 14 provides the impulse necessary to change the orbital state of orbit transfer vehicle 10 (i.e. moving to a higher orbit). As maneuver engine 14 is of conventional design, further description of its construction is not deemed necessary. Fuel tank 16 and oxidizer tank 18 are positioned forward of maneuvering engine 14 and are each coupled to maneuvering engine 14 for operation according to known principles.

Forward reaction control system 30 and aft reaction control system 20 each include a pair of thrust modules 32. Each thrust module 32 includes preferably three thrusters oriented in three axial directions (i.e. X-axis, Y-axis, and Z-axis). The pair of thrust modules 32 of forward reaction control system 30 are further oriented on opposing sides of orbit transfer vehicle 10. Likewise, the pair of thrust modules 32 of aft reaction control system 20 are oriented on opposing sides of orbit transfer vehicle 10. This arrangement provides six-axis control of orbit transfer vehicle 10.

The pair of energy absorbing panels 22 are preferably solar panels that are oriented to collect solar energy while in orbit. This solar energy is then converted into electrical energy and stored in energy storage device 24. Preferably, energy storage device 24 includes a plurality of batteries. However, other known energy storage devices may be used. It should be appreciated that orbit transfer vehicle 10 is completely self sustaining and, thus, does not require any external power source.

Controller 26 is coupled with any combination of the following components of orbit transfer vehicle 10: maneuvering engine 14, fuel tank 16, oxidizer tank 18, aft reaction control system 20, the pair of energy absorbing panels 22, energy storage device 24, payload interface 28, and forward reaction control system 30. This arrangement enables controller 26 to autonomously control maneuvering engine 14, aft reaction control system 20, payload interface 28, and forward reaction control system 30 to accomplish automatic dock, load, transport, and unload operations, without the need for human supervision or control. Controller 26 may obtain useful status information from the remaining components in order to maintain and insure proper operation.

Payload interface 28 is positioned immediately forward of propulsion and control module 12 and is designed to "appear" identical to the Space Shuttle payload bay. That is, payload interface 28 includes a plurality of fittings located within payload interface 28, which are adapted to coupled with the cargo to retain the cargo in payload interface 28. Cargo is attached using trunnion fittings (not shown) that are mounted to the sides and the keel of the cargo container or pallet. Payload interface 28 further includes power attachments for use with pressurized cargo.

Figure 8:
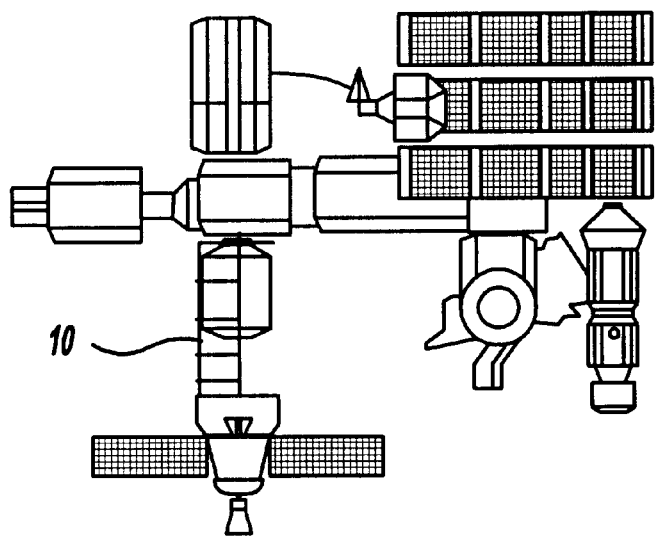
FIG. 8 is a side view illustrating the orbit transfer vehicle docked with the ISS.

As best seen in FIG. 8, orbit transfer vehicle 10 is dockable with the ISS at the Node 2 nadir. This attachment location was chosen to enable easy access to orbit transfer vehicle 10 by the crew of the ISS as well as the ISS remote manipulator arm (not shown). The remote manipulator arm of the ISS is used to transfer unpressurized cargo from orbit transfer vehicle 10 to the various storage locations on the ISS.

The orbit transfer vehicle of the present invention has a number of unique and useful advantages. For example, the orbit transfer vehicle of the present invention enables large volumes of cargo to be transported to the ISS at a significantly reduced cost. That is, the orbit transfer vehicle is capable of transporting this cargo more economically since it does not require human control and/or supervision. The elimination of the need for a crew eliminates the cost of the crew compartment, life support systems, and crew escape systems, all of which are very costly components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An orbit transfer vehicle for transporting cargo between a low Earth orbit and a high Earth orbit, said orbit transfer vehicle comprising:
   a body;
   an engine operably coupled to said body, said engine providing propulsion for the orbit transfer vehicle;
   a reaction control system operably coupled to said body, said reaction control system having a plurality of thrusters capable of maneuvering the orbit transfer vehicle;
   an energy absorbing panel operable to gather energy;
   an energy storage device operable to store said energy;
   a payload interface mechanism having a payload container area and a payload retaining device, said payload retaining device being connectable to the cargo; and
   a controller for autonomously controlling said engine, said reaction control system, and said payload interface mechanism to control the orbit transfer vehicle so as to transport the cargo between a low Earth orbit to a higher Earth orbit.

2. The orbit transfer vehicle according to claim 1 wherein said low Earth orbit is approximately 100 NM above median sea level and said higher Earth orbit is generally greater than about 150 NM above median sea level.

3. The orbit transfer vehicle according to claim 1 wherein said reaction control system comprises:
   a first reaction control module having a pair of thrust modules, each of said thrust modules of said first reaction control module having three thrusters oriented in three axial directions; and
   a second reaction control module having a pair of thrust modules, each of said thrust modules of said second reaction control module having three thrusters oriented in three axial directions.

4. The orbit transfer vehicle according to claim 1 wherein said engine is a chemical bi-propellant based rocket engine.

5. The orbit transfer vehicle according to claim 1 wherein said energy absorbing panel is an array of solar panels.

6. The orbit transfer vehicle according to claim 1 wherein said energy storage device is a plurality of batteries.

7. The orbit transfer vehicle according to claim 1 wherein said payload interface mechanism is a trunnion-based coupling system.

8. An orbit transfer vehicle for transporting cargo between a low Earth orbit and a high Earth orbit, said orbit transfer vehicle comprising:
   a body;
   an engine operably coupled to said body, said engine providing propulsion for the orbit transfer vehicle;

a forward reaction control module operably coupled to a forward portion of said body, said forward reaction control module having a pair of thrust modules, each of said thrust modules of said forward reaction control module having three thrusters oriented in three axial directions;

an aft reaction control module operably coupled to an aft portion of said body, said aft reaction control module having a pair of thrust modules, each of said thrust modules of said second reaction control module having three thrusters oriented in three axial directions;

an array of solar panels operable to gather energy;

an energy storage device operable to store said energy;

a payload interface mechanism having a payload container area and a payload retaining device, said payload retaining device being connectable to a plurality of trunnions mounted on the cargo; and a controller for autonomously controlling said engine, said reaction control system, and said payload interface mechanism to control the orbit transfer vehicle so as to transport the cargo between a low Earth orbit to a higher Earth orbit.

9. The orbit transfer vehicle according to claim 8 wherein said low Earth orbit is approximately 100 NM above median sea level and said higher Earth orbit is generally greater than about 150 NM above median sea level.

10. The orbit transfer vehicle according to claim 8 wherein said engine is a chemical bi-propellant based rocket engine.

11. The orbit transfer vehicle according to claim 8 wherein said energy storage device is a plurality of batteries.

* * * * *